(12) United States Patent
Yano et al.

(10) Patent No.: US 11,841,907 B2
(45) Date of Patent: Dec. 12, 2023

(54) INFORMATION PROCESSING SYSTEM AND INFORMATION PROCESSING METHOD

(71) Applicant: TOYOTA JIDOSHA KABUSHIKI KAISHA, Toyota (JP)

(72) Inventors: Masao Yano, Sunto-gun (JP); Tetsuya Shoji, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 17/348,017

(22) Filed: Jun. 15, 2021

(65) Prior Publication Data

US 2022/0004582 A1 Jan. 6, 2022

(30) Foreign Application Priority Data

Jul. 2, 2020 (JP) .................... 2020-115210

(51) Int. Cl.
*G06F 16/9038* (2019.01)
*G06F 16/904* (2019.01)
*G06F 16/903* (2019.01)

(52) U.S. Cl.
CPC ........ *G06F 16/9038* (2019.01); *G06F 16/904* (2019.01); *G06F 16/90348* (2019.01)

(58) Field of Classification Search
CPC ........... G06F 16/2458; G06F 16/90348; G06F 16/9038; G06F 16/904; G06F 16/90
See application file for complete search history.

(56) References Cited

U.S. PATENT DOCUMENTS

| | | | | |
|---|---|---|---|---|
| 5,191,611 A | * | 3/1993 | Lang | G07C 9/33 713/184 |
| 6,874,085 B1 | * | 3/2005 | Koo | H04L 63/0428 713/182 |
| 2008/0133929 A1 | * | 6/2008 | Gehrmann | G06F 21/51 713/179 |
| 2008/0146892 A1 | * | 6/2008 | LeBoeuf | A61B 5/0022 600/300 |

(Continued)

FOREIGN PATENT DOCUMENTS

| JP | 2003-215074 A | 7/2003 |
|---|---|---|
| JP | 2015-153235 A | 8/2015 |
| JP | 2015-221276 A | 12/2015 |

*Primary Examiner* — Taelor Kim
(74) *Attorney, Agent, or Firm* — Oblon, McClelland, Maier & Neustadt, L.L.P.

(57) ABSTRACT

The present disclosure provides an information processing system and an information processing method that, in a material analyzing service that is provided via a network, can appropriately manage data of a high degree of confidentiality. The system and method involve a user terminal that provides a data ID to a combination of first data that relates to a material, and second data that is data obtained by measuring the material and is data whose degree of confidentiality is lower than the first data. The user terminal stores the first data and data ID and transmits the second data and data ID to an information processing device. The information processing device carries out material analysis corresponding to the second data and transmits analysis results data to the user terminal. Accordingly, data having a high degree of confidentiality can be managed appropriately in a material analyzing service over a network.

14 Claims, 10 Drawing Sheets

(56) References Cited

U.S. PATENT DOCUMENTS

| | | | | |
|---|---|---|---|---|
| 2008/0172655 A1* | 7/2008 | Davia | ............... | G06F 8/77 |
| | | | | 717/130 |
| 2009/0287837 A1* | 11/2009 | Felsher | ............... | G06F 21/6245 |
| | | | | 709/229 |
| 2013/0173332 A1* | 7/2013 | Ho | ............... | G06Q 10/06 |
| | | | | 705/7.27 |
| 2015/0110249 A1* | 4/2015 | Bakeman | ............... | G01N 23/207 |
| | | | | 378/87 |
| 2016/0170649 A1* | 6/2016 | Ramesh | ............... | G06F 3/0679 |
| | | | | 711/165 |

* cited by examiner

FIG.2

| DATA ID | TEMPERATURE | TIME | ... | STRENGTH | DURABILITY | ... | ... |
|---|---|---|---|---|---|---|---|
| | ⎴ 30 ⎴ | | | ⎴ 32 ⎴ | | | |
| 00001 | A1 | B1 | ... | C1 | D1 | ... | ... |
| 00002 | A2 | B2 | ... | C2 | D2 | ... | ... |
| ... | ... | ... | ... | ... | ... | ... | ... |
| ... | ... | ... | ... | ... | ... | ... | ... |

FIG.4

| ANALYZING TECHNIQUE ID | PROGRAM | ... |
|---|---|---|
| 00001 | ... | ... |
| 00002 | ... | ... |
| ... | ... | ... |
| ... | ... | ... |

FIG.5

| DATA ID | XRD | SAXS | ... | XRD-R | SAXS-R | ... |
|---|---|---|---|---|---|---|
| 00001 | X1 | Y1 | ... | W1 | Z1 | ... |
| 00002 | X2 | Y2 | ... | W2 | Z2 | ... |
| ... | ... | ... | ... | ... | ... | ... |
| ... | ... | ... | ... | ... | ... | ... |

{34: XRD, SAXS, ...} {36: XRD-R, SAXS-R, ...}

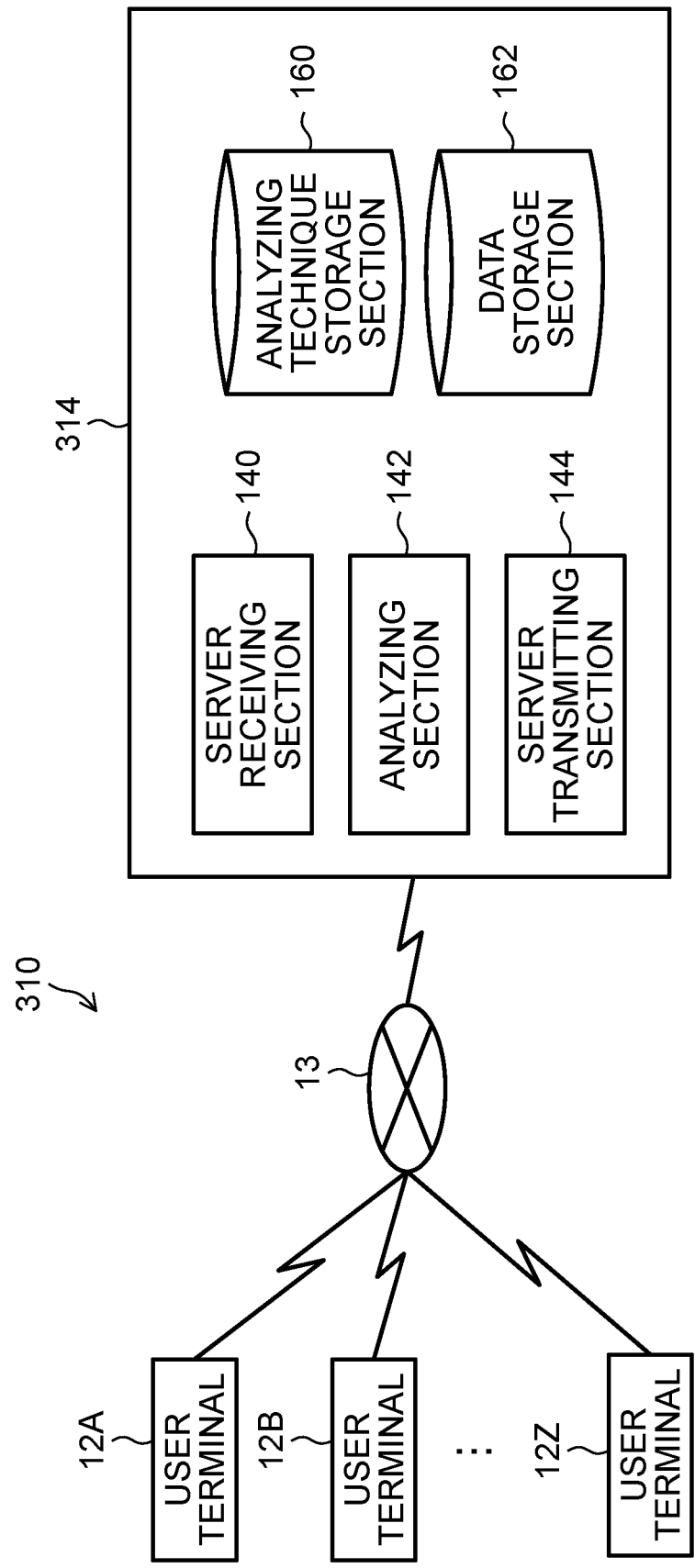

INFORMATION PROCESSING SYSTEM AND INFORMATION PROCESSING METHOD

CROSS-REFERENCE TO RELATED APPLICATION

This application is based on and claims priority under 35 USC 119 from Japanese Patent Application No. 2020-115210 filed on Jul. 2, 2020, the disclosure of which is incorporated by reference herein.

BACKGROUND

Technical Field

The present disclosure relates to an information processing system and an information processing method.

Related Art

An information processing device that realizes an analyzing service without disclosing the source code is conventionally known (see, for example, Japanese Patent Application Laid-Open (JP-A) No. 2015-153235). In the information processing device disclosed in JP-A No. 2015-153235, a user submits data (a file), which is in an intermediate format and has been prepared in at least any one step of a source code analyzing process, to an information processing device that is managed by an analyzing service provider. Then, the information processing device delivers to the user a report that is obtained as the result of continuing analysis on the basis thereof (for example, refer to paragraph [0023]). Due thereto, the user can utilize the analyzing service without disclosing the source code. Therefore, the process is completed without the user disclosing, to the analyzing service provider, the source code itself that is product information that has been prepared by taking up a huge amount of time.

The technique disclosed in above-described JP-A No. 2015-153235 is a technique whose object is a source code, and does not take into consideration other data that has a high degree of confidentiality.

For example, at the time of carrying out analysis of a material, the data that relates to the production process of that material, and the like, are information whose degree of confidentiality is high, and it is not desirable to disclose that information to others.

On the other hand, measurement data, which is obtained by measuring the material that is the object of analysis, has a low degree of confidentiality as compared with data relating to the production process of the material. Therefore, for example, a material analyzing service that is provided via a network has been conceived of in which a user transmits the measurement data of the material to a server, and the server outputs results of analysis corresponding to the measurement data.

However, only source codes are the object of the technique of above-described JP-A No. 2015-153235, and this technique does not consider the analysis of materials. Therefore, there is the problem that the technique of JP-A No. 2015-153235 cannot appropriately manage data having a high degree of confidentiality in a case in which a user utilizes a material analyzing service that is provided via a network.

SUMMARY

In view of the above-described circumstances, the present disclosure provides an information processing system and an information processing method that, in a material analyzing service that is provided via a network, can appropriately manage data of a high degree of confidentiality.

An information processing system of a first aspect is an information processing system including a user terminal and an information processing device, wherein the user terminal: provides a data ID to a combination of first data that relates to a material, and second data that is data obtained by measuring the material and is data having a degree of confidentiality that is lower than the first data; stores a pair consisting of the first data and the data ID in a first storage section; and transmits a pair consisting of the second data and the data ID to the information processing device, and the information processing device: receives the pair consisting of the second data and the data ID transmitted from the user terminal; stores the pair consisting of the second data and the data ID in a second storage section; carries out material analysis corresponding to the second data, and generates analysis results data corresponding to the second data; and transmits the analysis results data to the user terminal.

The user terminal provides a data ID to a combination of the first data that relates to a material, and the second data that is data obtained by measuring the material and is data whose degree of confidentiality is lower than the first data, and stores the pair consisting of the first data and the data ID in the first storage section. The user terminal transmits the pair consisting of the second data and the data ID to the information processing device. Further, the information processing device receives the pair consisting of the second data and the data ID transmitted from the user terminal, and stores the pair consisting of the second data and the data ID in the second storage section. The information processing device carries out material analysis corresponding to the second data, and generates analysis results data corresponding to the second data, and transmits the analysis results data to the user terminal. Due thereto, data having a high degree of confidentiality can be managed appropriately in a material analyzing service that is provided via a network.

The first data of an information processing system of a second aspect includes one or both of data, which relates to processes for producing the material, and data, which relates to performances of the material. The second data of an information processing system of the second aspect includes data obtained by measuring the material via a predetermined measuring method. Due thereto, the risk of information leakage of data relating to the processes at the time of producing the material or data relating to the performances of the material can be reduced.

The first storage section of an information processing system of a third aspect is a storage section that is different from a storage section that the user terminal has. A storage section at which the risk of information leakage is low can be provided, even if not the storage section that the user terminal itself has. Therefore, data of a high degree of confidentiality can be managed appropriately due to the first data being stored in the first storage section which is different than the storage section that the user terminal itself has and at which the risk of information leakage is low.

An information processing method of a fourth aspect is an information processing method that is executed in an information processing system that includes a user terminal and an information processing device, the method including: the user terminal: providing a data ID to a combination of first data that relates to a material, and second data that is data obtained by measuring the material and is data having a degree of confidentiality is lower than the first data; storing a pair consisting of the first data and the data ID in a first storage section; and transmitting a pair consisting of the second data and the data ID to the information processing device, and the information processing device: receiving the pair consisting of the second data and the data ID transmitted from the user terminal; storing the pair consisting of the second data and the data ID in a second storage section; carrying out material analysis corresponding to the second data, and generating analysis results data corresponding to the second data; and transmitting the analysis results data to the user terminal.

As described above, in accordance with the present disclosure, there is the effect that data of a high degree of confidentiality can be appropriately managed in a material analyzing service that is provided via a network.

BRIEF DESCRIPTION OF THE DRAWINGS

FIG. 2 is a drawing showing an example of data that is stored in a terminal storage section.

FIG. 4 is a drawing showing an example of data that is stored in an analyzing technique storage section.

FIG. 5 is a drawing showing an example of data that is stored in a data storage section.

FIG. 10 is a drawing showing a modified example of the embodiment.

DETAILED DESCRIPTION

<Embodiments>

A huge amount of work and time are involved when carrying out analysis of a material by using plural analyzing techniques. For example, in a case in which there are plural materials that are objects of analysis, or in a case in which there are plural samples of a single material, analysis using the respective analyzing techniques must be carried out on each of these plural materials, and the work and time that are involved therein become enormous.

Thus, in the information processing system of the present embodiment, a user transmits data relating to a sample to a server that is on the cloud, via a user terminal that is a terminal that the user operates. Then, the server carries out material analysis on the basis of the received data, and transmits the data that is the results of the analysis (hereinafter simply called "analysis results data") to the user terminal. Due thereto, the user can efficiently obtain analysis results data of the material.

Note that there are cases in which the data that relates to the material includes data having a high degree of confidentiality. For example, data that relates to the processes at the time of producing the material, and data that relates to the performances of the material, and the like have a higher degree of confidentiality than measurement data that is obtained by measuring the material. It is not preferable to transmit such data having a high degree of confidentiality to an external server at the time of obtaining a material analyzing service that is provided via a network.

Thus, the user terminal of the information processing system of the present embodiment transmits measurement data, which is obtained by measuring a material, to an external server, and stores data, which is different than measurement data and whose degree of confidentiality is high, in a storage section of the user terminal or in a specific storage section that is different than the external server. Due thereto, data having a high degree of confidentiality can be managed appropriately in a material analyzing service that is provided via a network.

The information processing system of the embodiment is described hereinafter by using the drawings.

Figure 1:
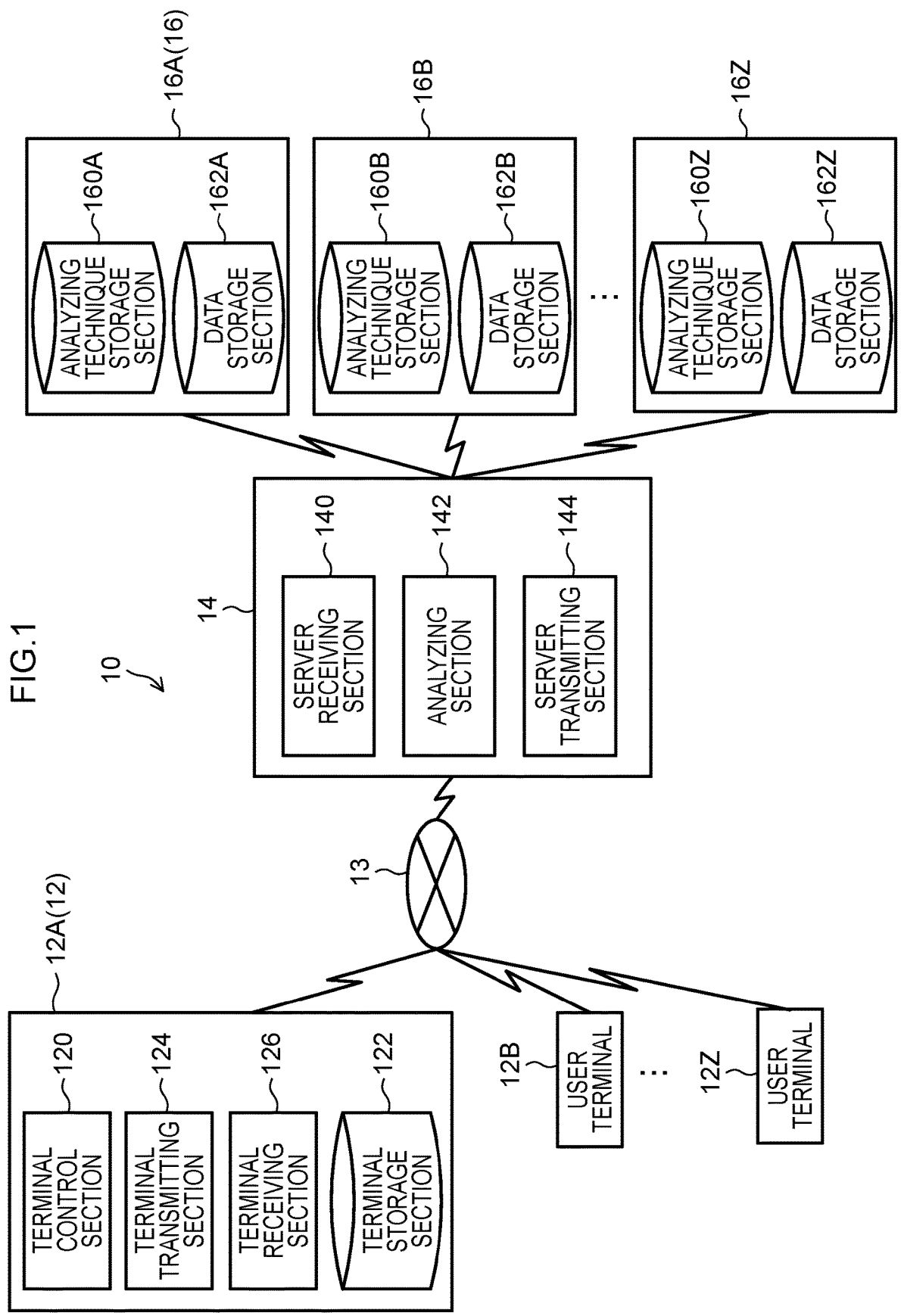
FIG. 1 is a schematic block drawing of an information processing system relating to an embodiment.

FIG. 1 is a block drawing showing an example of the functional structures of an information processing system 10 relating to an embodiment. As shown in FIG. 1, the information processing system 10 has plural user terminals 12A, 12B, . . . , 12Z, a server 14 that is an example of the information processing device, and plural storage devices 16A, 16B, . . . , 16Z. The plural user terminals 12A, 12B, . . . , 12Z and the server 14 are connected via a network 13 such as, for example, the internet or the like. Further, the server 14 and the plural storage devices 16A, 16B, . . . , 16Z are connected via a network such as, for example, a local area network (LAN) or the internet or the like. Note that, in the following description, when a single user terminal is specified, it is simply called the user terminal 12. Further, when a single storage device is specified, it is simply called the storage device 16.

(User Terminal)

The plural user terminals 12A, 12B, . . . , 12Z are operated by plural, different users, respectively.

As shown in FIG. 1, the one user terminal 12 has a terminal control section 120, a terminal storage section 122, a terminal transmitting section 124, and a terminal receiving section 126.

A user inputs data relating to a material that is the object of analysis (hereinafter simply called "material data") into the user terminal 12 that he/she operates.

Various types of data are included in the material data. For example, production process data that is data relating to the processes at the time of producing the material, performance data that is data relating to the performances of the material, measurement data that is data obtained by measuring the material by predetermined measuring methods, and the like are included in the material data.

The production process data is, for example, data relating to the processes at the time of producing the material, and is data such as temperature, time, pressure and the like in the processes of producing the material. The performance data is data such as, for example, the strength, durability, toughness and the like of the material. The measurement data is data obtained as a result of measuring the material by a predetermined measuring method. Note that the production process data and the performance data are an example of the first data. The measurement data is an example of the second data.

The measurement data is data obtained in a case in which some type of measurement is carried out on the material. For example, in a case in which it is desired to obtain the particle diameter distribution of the particles that structure the material by using the small-angle X-ray scattering (SAXS)

method or the like on the material, the data obtained by measurement in accordance with the SAXS method is the measurement data.

The terminal control section 120 receives the material data that is inputted from the user.

The terminal control section 120 provides a common data ID to a combination of production process data, performance data and measurement data, among the material data. Then, the terminal control section 120 stores the combination of the production process data, the performance data and the data ID in the terminal storage section 122.

FIG. 2 shows an example of data that is stored in the terminal storage section 122. As shown in FIG. 2, data 30 such as "temperature, "time" and the like at the time of producing the material which are examples of the production process data, data 32 such as the "strength" and "durability" and the like of the material that are examples of the performance data, and the data ID are set in correspondence with one another. Here, temperature: A1, time: B1, strength: C1, and durability: D1 which correspond to the data ID "00001" are data relating to the same material.

The terminal transmitting section 124 transmits the pair of the data ID and the measurement data that were obtained by processing of the terminal control section 120, to the server 14 via the network 13. Note that the terminal transmitting section 124 also transmits a user ID that expresses identification information of the user terminal 12, and an analyzing technique ID that is for identifying the analyzing technique, to the server 14.

Figure 3:
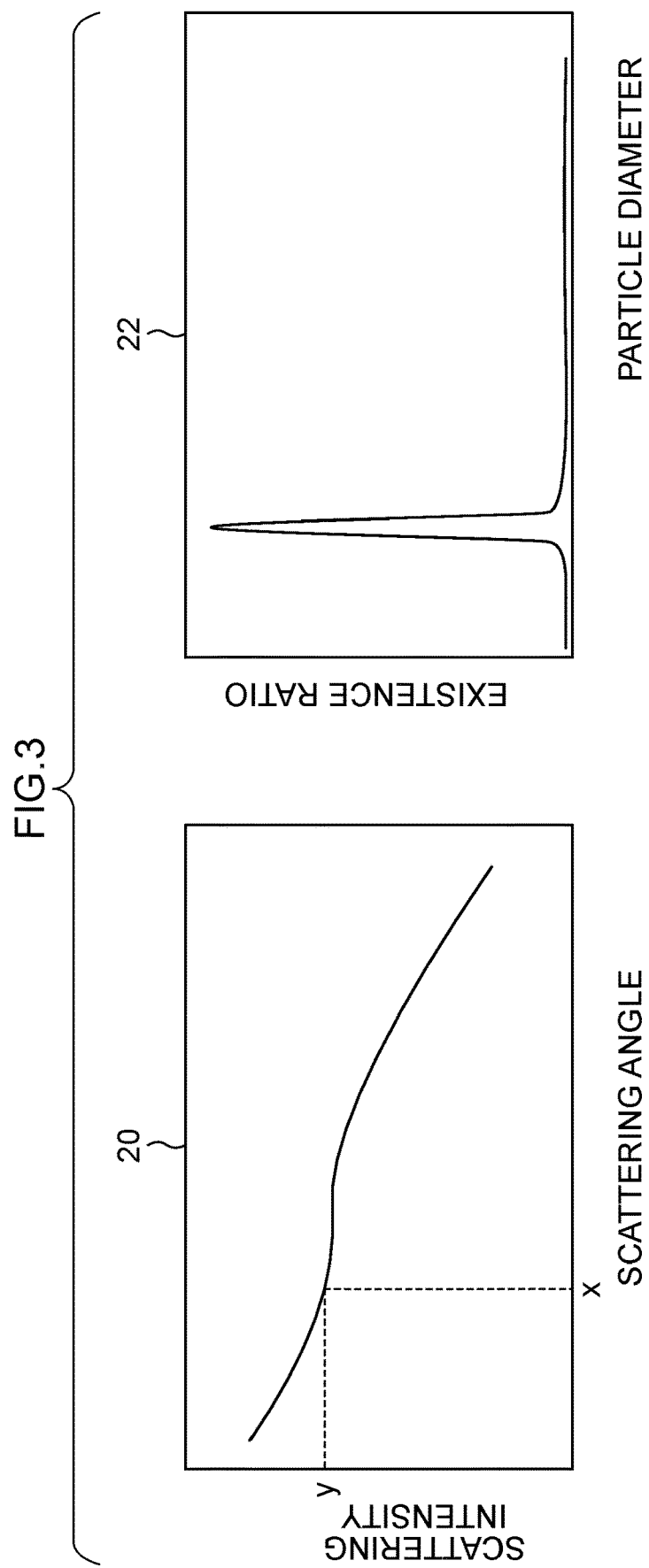
FIG. 3 is a drawing showing an example of measurement data and analysis results data.

Analysis using the measurement data transmitted from the user terminal 12 is carried out at the server 14 that is described later. For example, the user terminal 12 transmits measurement data 20 shown in FIG. 3 to the server 14. The measurement data 20 shown in FIG. 3 is data obtained by measurement in accordance with the SAXS method, and the measurement data 20 is scattering angle x and scattering intensity y. By analyzing this measurement data 20, the server 14 generates analysis results data 22, and transmits the analysis results data 22 to the user terminal 12. Note that the analysis results data 22 shown in FIG. 3 is the particle diameter of the particles contained in the material and the existence ratio of particles of the particle diameters.

The terminal receiving section 126 receives the analysis results data that is transmitted from the server 14, and displays the analysis results data on a display portion (not shown).

(Storage Device)

The plural storage devices 16A, 16B, . . . , 16Z are provided for the plural user terminals, respectively. Concretely, the storage device 16A is provided for the user terminal 12A, the storage device 16B is provided for the user terminal 12B, and the storage device 16Z is provided for the user terminal 12Z.

As shown in FIG. 1, the storage device 16A has an analyzing technique storage section 160A and a data storage section 162A. The storage device 16B has an analyzing technique storage section 160B and a data storage section 162B. The storage device 16Z has an analyzing technique storage section 160Z and a data storage section 162Z. Note that, hereinafter, when a single analyzing technique storage section or data storage section is specified, it is simply called the analyzing technique storage section 160 or the data storage section 162 without the letter A, B, Z being appended thereto.

The server 14 that is described hereafter selects one or more analyzing techniques from the analyzing technique storage section 160 of the storage device 16 that corresponds to the user terminal 12 that transmitted the measurement data. The server 14 analyzes the measurement data by the selected analyzing technique, and obtains the analysis results data. Then, the server 14 stores the measurement data and the analysis results data in the data storage section 162 of the storage device 16 that corresponds to the user terminal 12 that transmitted the measurement data. Details thereof are described hereafter.

(Server)

As shown in FIG. 1, the server 14 has a server receiving section 140, an analyzing section 142, and a server transmitting section 144.

The server receiving section 140 receives a pair of the measurement data and the data ID of the material that is the object of analysis, which were transmitted from the user terminal 12. Note that the data that is transmitted from the server 14 may be the data of each of the plural analyzing techniques. Further, the server receiving section 140 receives the user ID for identifying the user terminal, and the analyzing technique ID for identifying the analyzing technique.

The analyzing section 142 analyzes the measurement data received by the server receiving section 140, by one or more analyzing techniques. Concretely, the analyzing section 142 selects an analyzing technique from among the plural analyzing techniques that are stored in the analyzing technique storage section 160 of the storage device 16. In this case, the analyzing section 142 selects, in accordance with the user ID transmitted from the user terminal 12, the storage device 16 that corresponds to the user terminal 12 that transmitted the measurement data. For example, in a case in which measurement data is transmitted from the user terminal 12A, the analyzing section 142 selects the storage device 16A. Then, the analyzing section 142 selects the analyzing technique, which corresponds to the analyzing technique ID transmitted from the user terminal 12A, from among the analyzing techniques that are stored in the analyzing technique storage section 160A of the storage device 16A.

Programs that correspond to plural analyzing techniques, and the like, are stored in the analyzing technique storage section 160. FIG. 4 is an example of the format of the data stored in the analyzing technique storage section 160. As shown in FIG. 4, for example, the analyzing technique ID that is identification information of the analyzing technique, and the program of that analyzing technique, and the like are stored in correspondence with one another in the analyzing technique storage section 160.

Then, the analyzing section 142 carries out analysis of the measurement data by using the program of the analyzing technique that was the object of selection. Analysis results data is thereby obtained.

The server transmitting section 144 transmits the analysis results data obtained by the analyzing section 142 to the user terminal 12. Concretely, the server transmitting section 144 transmits the analysis results data to the user terminal 12 that corresponds to the user ID received by the server receiving section 140. For example, in a case in which the user ID indicates the user terminal 12A, the server transmitting section 144 transmits the analysis results data to the user terminal 12A.

Further, the analyzing section 142 stores the data ID and the measurement data received by the server receiving section 140, and the analysis results data, in correspondence with one another in the data storage section 162. Note that the data storage section 162 is set in advance per user. Therefore, the analyzing section 142 stores the data ID and the measurement data received by the server receiving section 140, and the analysis results data, in correspondence with one another in the data storage section 162 that corresponds to the user ID received by the server receiving section 140. For example, in a case in which the user ID indicates the user terminal 12A, the analyzing section 142 stores the respective data in the data storage section 162A of the storage device 16A that corresponds to the user terminal 12A.

An example of the data that is stored in the data storage section 162 is shown in FIG. 5. FIG. 5 is an example in which measurement data is stored per each of the plural analyzing techniques. As shown in FIG. 5, data 34 such as "X1" that is measurement data corresponding to an XRD (X-ray diffraction) method that is an example of an analyzing technique, "Y1" that is measurement data corresponding to an SAXS (Small-Angle X-ray Scattering) method, and the like, and data 36 such as "W1" that is analysis results data corresponding to the XRD method, "Z1" that is measurement data corresponding to the SAXS method, and the like, and the data ID are set in correspondence with one another.

Here, XRD:X1, SAXS:Y1, XRD-R:W1 and SAXS-R:Z1 that are set in correspondence with the data ID "00001" are data relating to the same material.

In this way, in the information processing system 10 of the present embodiment, production process data and performance data that are data having high degrees of confidentiality are stored in the terminal storage section 122 of the user terminal 12, and the measurement data, which is data having a lower degree of confidentiality than the production process data and the performance data, is stored in the data storage section 162 of the server 14. Therefore, data having a high degree of confidentiality can be managed appropriately. Concretely, because there is no need to transmit data of a high degree of confidentiality to an external server, the risk of information leakage of data having a high degree of confidentiality can be reduced.

Moreover, analysis that is useful to materials development (e.g., statistical analysis or the like) can be carried out by comparing the data that is stored in the terminal storage section 122 and the data that is stored in the data storage section 162. For example, by carrying out statistical analysis by using a combination of analysis results data, production process data and performance data, it is possible to obtain, with respect to a material that has useful performances, the knowledge of what kinds of analysis results data such a material corresponds to, and what types of production processes such a material must go through.

Figure 6:
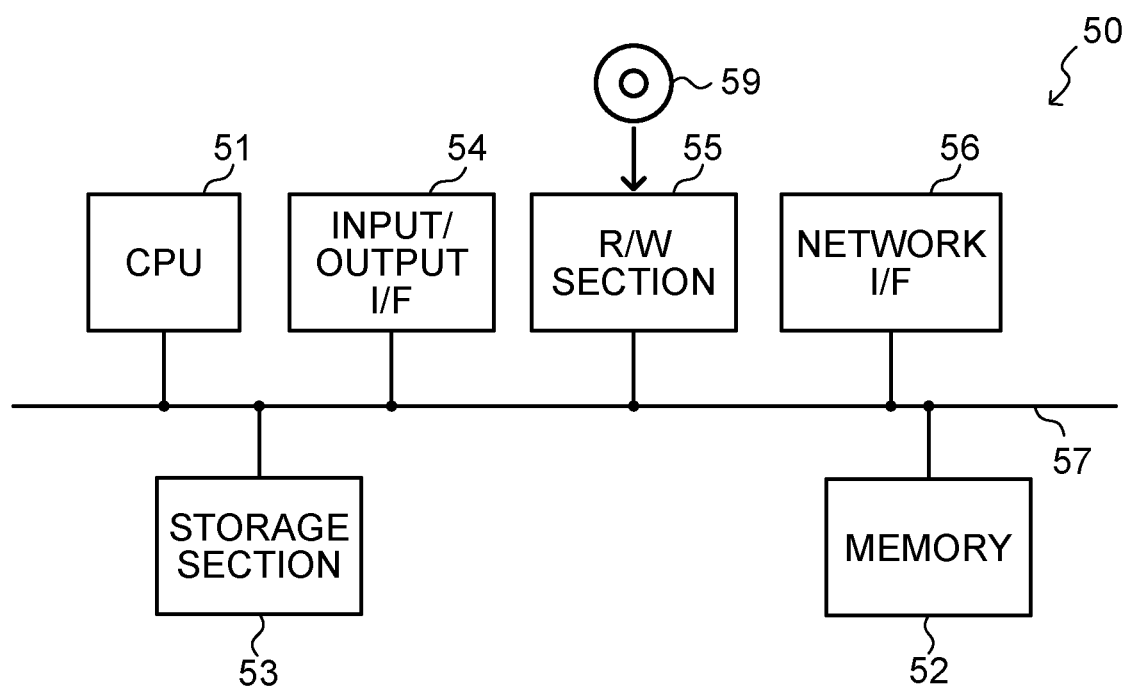
FIG. 6 is a drawing showing a structural example of a computer of a user terminal, a server and a storage device relating to the embodiment.

The user terminal 12, the server 14 and the storage device 16 can be realized by a computer 50 such as shown in FIG. 6 for example. The computer 50 that realizes the user terminal 12, the server 14 and the storage device 16 has a CPU 51, a memory 52 that serves as a temporary storage region, and a non-volatile storage section 53. Further, the computer has an input/output interface (I/F) 54 to which input/output devices and the like (not illustrated) are connected, and a read/write (R/W) section 55 that controls the reading and writing of data from and to a recording medium 59. The computer has a network I/F 56 that is connected to a network such as the internet or the like. The CPU 51, the memory 52, the storage section 53, the input/output I/F 54, the R/W section 55 and the network I/F 56 are connected to one another via a bus 57.

The storage section 53 can be realized by a Hard Disk Drive (HDD), a Solid State Drive (SSD), a Flash memory, or the like. A program for causing the computer to function is stored in the storage section 53 that serves as a storage medium. The CPU 51 reads-out the program from the storage section 53, expands the program in the memory 52, and successively executes the processes that the program has.

Operation of the information processing system 10 of the embodiment is described next.

Figure 7:
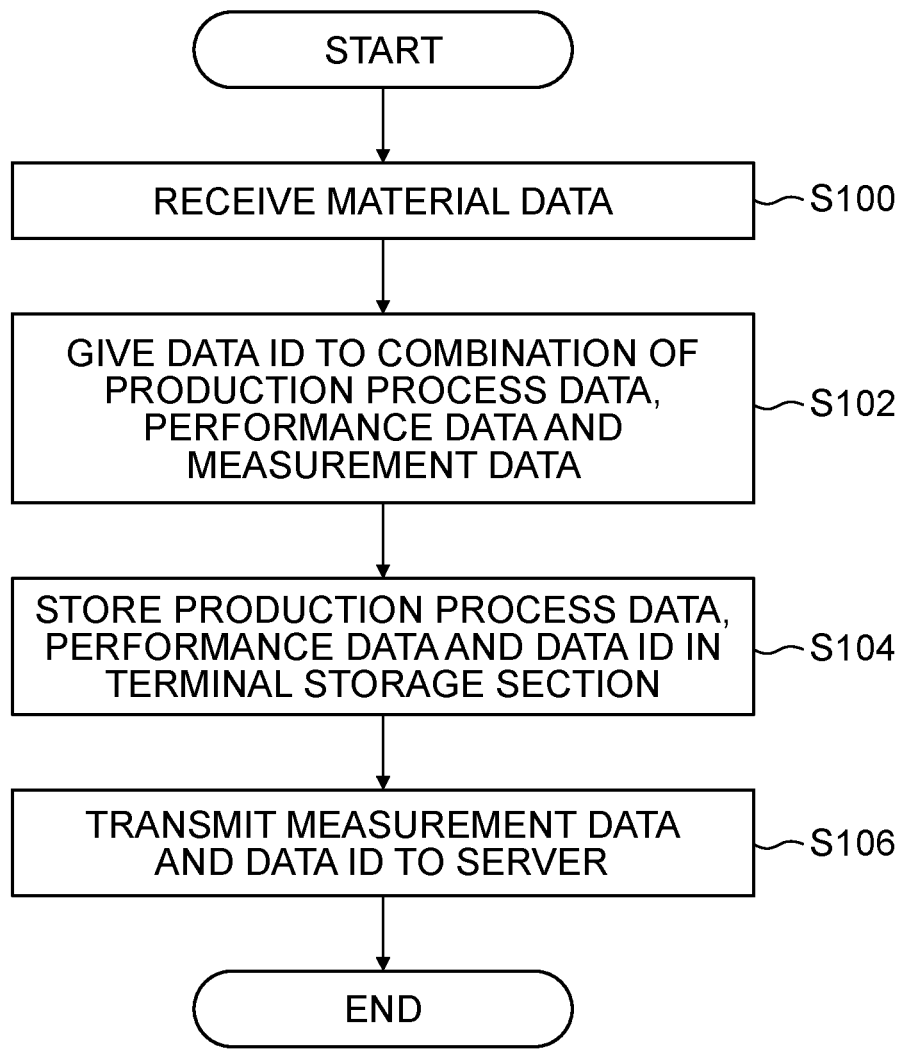
FIG. 7 is a flowchart showing an example of first information processing that is carried out at the information processing system relating to the embodiment.

When material data is inputted to the user terminal 12, the user terminal 12 executes a first information processing routine that is shown in FIG. 7.

In step S100, the terminal control section 120 receives the material data.

In step S102, the terminal control section 120 provides a data ID to a combination of production process data, performance data, and measurement data among the material data.

In step S104, the terminal control section 120 stores, in the terminal storage section 122, the production process data, the performance data and the data ID that were obtained in above-described step S102.

In step S106, the terminal control section 120 transmits the measurement data and the data ID that were obtained in above-described step S102 to the server 14. Further, the terminal control section 120 transmits the user ID and the analyzing technique ID to the server 14.

Figure 8:
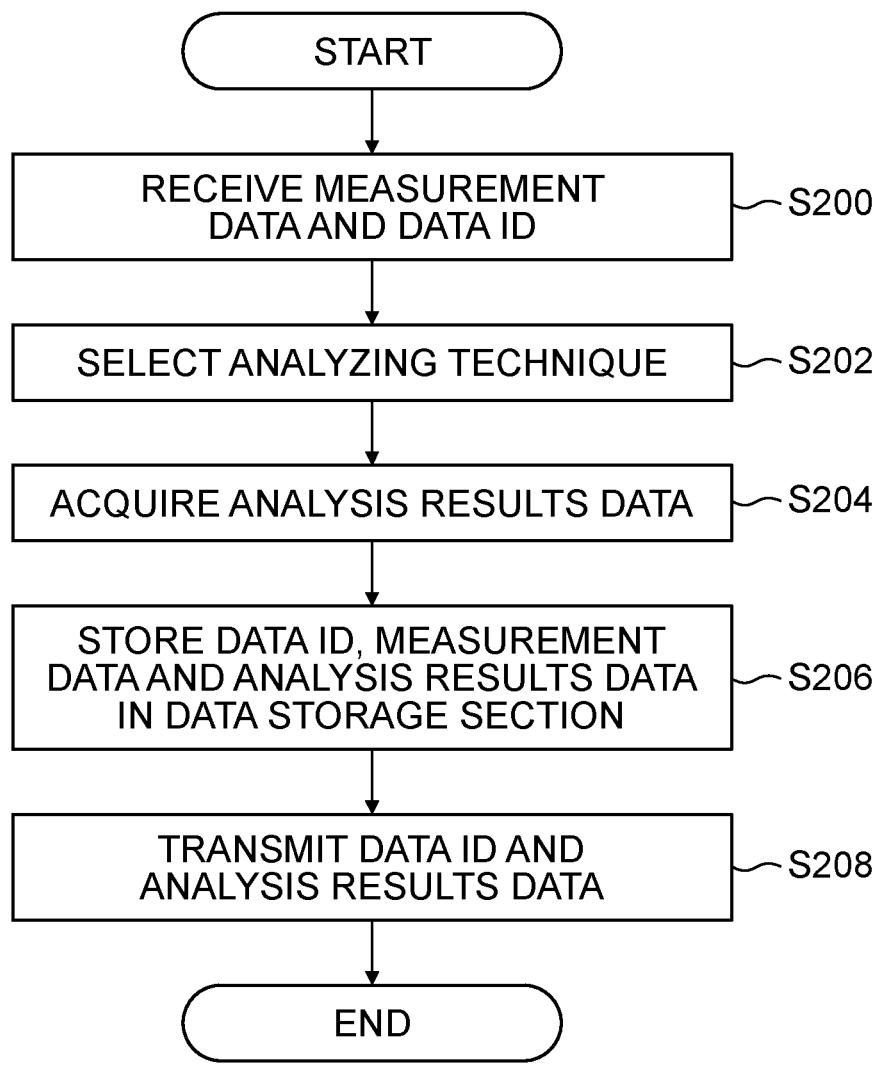
FIG. 8 is a flowchart showing an example of second information processing that is carried out at an information processing system relating to the embodiment.

When the measurement data and the data ID, and the user ID and the analyzing technique ID, are transmitted from the user terminal 12 to the server 14, and the server 14 receives these data, the server 14 executes the second information processing routine that is shown in FIG. 8.

In step S200, the server receiving section 140 of the server 14 receives the data ID and the measurement data that were transmitted from the user terminal 12. Further, the server receiving section 140 receives the user ID and the analyzing technique ID that were transmitted from the user terminal 12.

In step S202, the analyzing section 142 selects an analyzing technique for the measurement data that was received in above-described step S200. Concretely, the analyzing section 142 selects an analyzing technique in accordance with the analyzing technique ID that was transmitted from the user terminal 12. Note that the analyzing section 142 selects the storage device 16 that corresponds to the user ID that was received in above-described step S200, and, from among the analyzing techniques that are stored in the analyzing technique storage section 160 of that storage device 16, selects that analyzing technique that corresponds to the analyzing technique ID.

In step S204, the analyzing section 142 carries out analysis of the measurement data by using the analyzing technique that was the object of selection in above-described step S202, and obtains analysis results data.

In step S206, the analyzing section 142 stores the combination of the measurement data and the data ID received in above-described step S200 in the data storage section 162, in correspondence with the analysis results data obtained in above-described step S204.

In step S208, the server transmitting section 144 transmits, to the user terminal 12, the analysis results data that was obtained in above-described step S204 and the data ID. Concretely, the server transmitting section 144 transmits the analysis results data and the data ID to the user terminal that corresponds to the user ID received in above-described step S200.

The user terminal 12 obtains the analysis results data and the data ID that are transmitted from the server 14. Then, the terminal control section 120 of the user terminal 12 displays the analysis results data on the display portion (not illustrated). The user who operates the user terminal 12 confirms the analysis results data of the material that is the object of analysis.

Note that the user terminal 12 may store, in the terminal storage section 122, the data ID and the analysis results data that were transmitted from the server 14. In this case, the user terminal 12 stores the analysis results data in the terminal storage section 122 in correspondence with the production process data and the performance data, by using the data ID as the key.

As described above, the user terminal of the information processing system 10 relating to the embodiment provides a data ID to the combination of production process data and performance data, which are an example of first data and relates to a material, and measurement data, which is an example of second data that is data obtained by measuring the material and is data whose degree of confidentiality is lower than the production process data and the performance data. Then, the user terminal stores the pair of, on the one hand, the data ID, and, on the other hand, the production process data and the performance data, in the terminal storage section that is an example of the first storage section. Further, the user terminal transmits the pair of the measurement data and the data ID to the server. The server receives the pair of the measurement data and the data ID that were transmitted from the user terminal. The server stores the pair of the measurement data and the data ID in a data storage section that is an example of the second storage section. The server carries out material analysis that corresponds to the measurement data, and generates analysis results data that corresponds to the measurement data, and transmits this analysis results data to the user terminal. Due thereto, data having a high degree of confidentiality can be managed appropriately in a material analyzing service that is provided via a network. Concretely, because there is no need to transmit data of a high degree of confidentiality to an external server, the risk of information leakage of data having a high degree of confidentiality can be reduced.

Moreover, analysis that is useful to materials development (e.g., statistical analysis or the like) can be carried out by comparing the data that is stored in the terminal storage section 122 and the data that is stored in the data storage section 162, by using a given data ID as a key. For example, by carrying out statistical analysis by using a combination of the analysis results data, the production process data and the performance data, it is possible to obtain, with respect to a material that has useful performances, the knowledge of what kinds of analysis results data such a material corresponds to, and what types of production processes such a material must go through.

Further, in accordance with the information processing system 10 relating to the present embodiment, a data storage section is provided for each of the plural user terminals. The server 14 stores the measurement data and the analysis results data in the data storage section that corresponds to the user terminal that transmitted the measurement data. Due thereto, information can be managed appropriately. For example, in a case in which the plural user terminals 12A, 12B, . . . , 12Z are utilized by different companies, the data of the plural companies is not stored in a single data storage section, and therefore, information can be managed appropriately.

Further, in the information processing system 10 relating to the present embodiment, because there is the single server 14 that carries out material analysis, the costs at the time of implementing the system can be reduced.

Note that the processings that are carried out at the respective devices in the above-described embodiment are described as software processings that are carried out by executing a program, but these may be processings that are carried out by hardware. Or, the processings may be processings that combine both software and hardware. Further, the program that is stored in the ROM may be stored on any of various types of storage media and distributed.

Note that the present disclosure is not limited to the above, and, other than the above, can of course be implemented by being modified in various ways within a scope that does not depart from the gist thereof.

For example, although the above-described embodiment describes, as an example, a case in which there is a single server, the present disclosure is not limited to this, and a server may be provided for each of the plural user terminals. For example, there may be a structure such as an information processing system 210 that is shown in FIG. 9.

Figure 9:
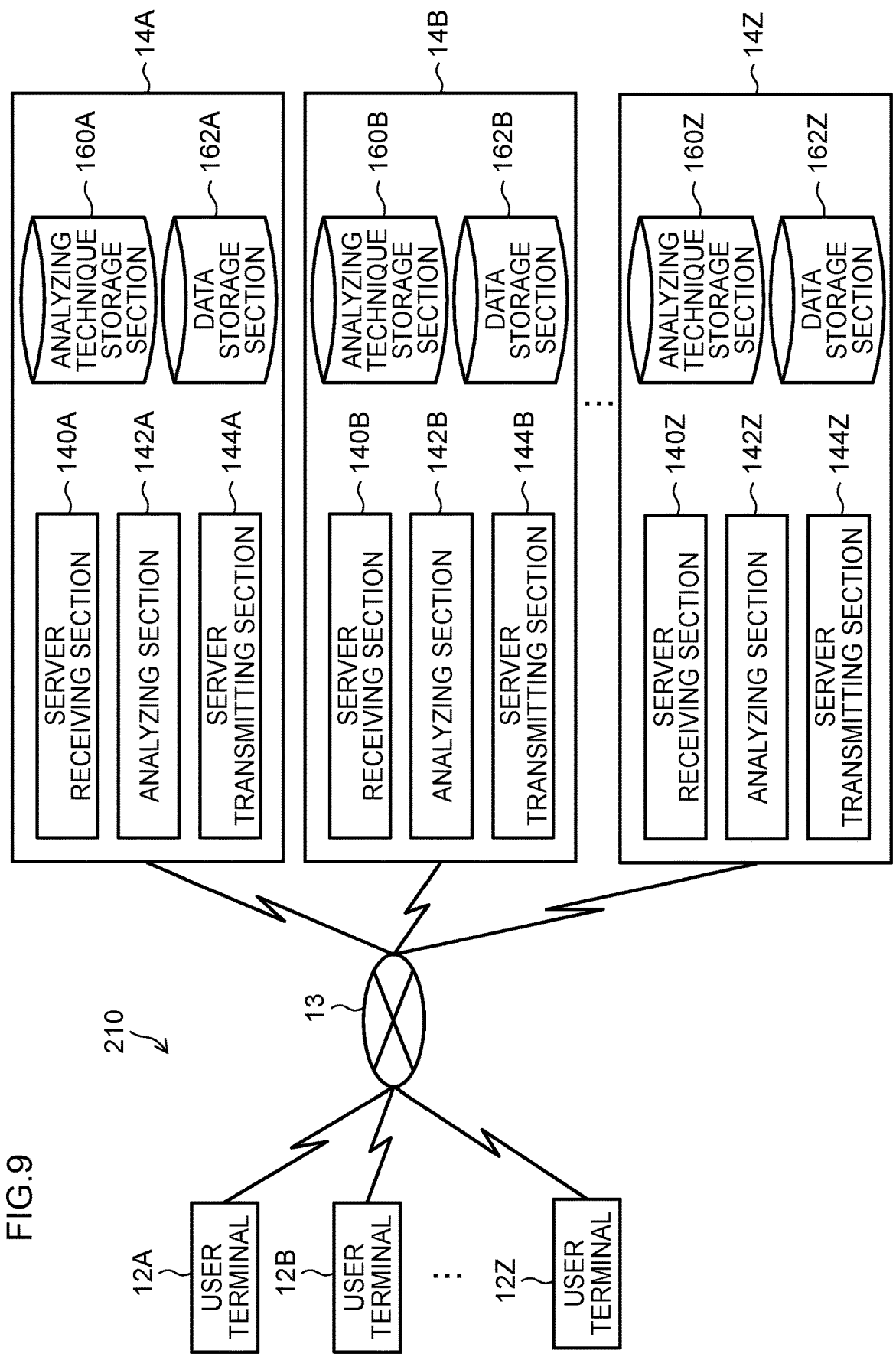
FIG. 9 is a drawing showing a modified example of the embodiment.

The information processing system 210 of FIG. 9 has the plural user terminals 12A, 12B, . . . , 12Z, and servers 14A, 14B, . . . , 14Z that are provided for the plural user terminals 12A, 12B, . . . , 12Z respectively. Note that, as shown in FIG. 9, the servers 14A, 14B, . . . , 14Z have the analyzing technique storage sections 160A, 160B, . . . , 160Z, and the data storage sections 162A, 162B, . . . , 162Z, respectively. Each of the servers 14A, 14B, . . . , 14Z receives the measurement data that is transmitted from a specific user terminal among the plural user terminals 12A, 12B, . . . , 12Z, and carries out analysis by one or more analyzing techniques on the received measurement data, and acquires analysis results data that expresses the results of analysis. Then, the server 14A, 14B, . . . , 14Z transmits the analysis results data to the specific user terminal, and stores, in the data storage section that that server has, the received measurement data and the analysis results data in correspondence with one another.

For example, the server 14A receives measurement data transmitted from the user terminal 12A that is a specific user terminal, and carries out analysis in accordance with one or more analysis techniques on the measurement data, and acquires analysis results data that express the results of the analysis. Then, the server 14A transmits the analysis results data to the user terminal 12A that is the specific user terminal, and stores the received measurement data and the analysis results data in correspondence with one another in the data storage section 162A that the server 14A has.

In accordance with the information processing system 210 of FIG. 9, because a server is provided for each of the user terminals, the speed of the material analysis processing can be increased.

Further, although the above embodiment describes, as an example, a case in which a data storage section is provided at each of the plural user terminals, the present disclosure is not limited to this. For example, there may be a structure such as an information processing system 310 that is shown in FIG. 10.

A server 314 of the information processing system 310 shown in FIG. 10 receives measurement data transmitted from a user terminal. The server 314 carries out analysis by one or more analyzing techniques on the received measurement data, and acquires analysis results data that express the results of analysis. Then, the server 314 transmits the acquired analysis results data to the user terminal. In the information processing system 310 of FIG. 10, because a server is not provided for each of the user terminals, the costs at the time of implementing the system can be reduced. Further, the respective data can be shared in a case in which plural users who belong to one company respectively utilize the plural user terminals 12A, 12B, ..., 12Z.

Further, the above embodiment describes, as an example, a case in which the analyzing section 142 selects the analyzing technique in accordance with the analyzing technique ID that is identification information of an analyzing technique and that is transmitted from the user terminal 12. However, the present disclosure is not limited to this. For example, the analyzing section 142 may select the analyzing technique in accordance with the values of or the type of the measurement data (the distribution of values (0.1 to 1, or the like), or whether the data is an image or is numerical data).

The above embodiment describes, as an example, a case in which the server 14 selects the analyzing technique, and carries out analysis in accordance with the selected analyzing technique. However, the present disclosure is not limited to this. For example, plural servers may be prepared in advance so as to each correspond to a different analyzing technique, and analysis may be executed by using these servers.

Further, although the above embodiment describes, as an example, a case in which the first data is the production process data and the performance data, the present disclosure is not limited to this. The first data may be either one of the production process data and the performance data. Namely, the first data may be either one of or both of the production process data and the performance data. Further, the first data may be data that is different than production process data and performance data.

Although the above describes, as an example, a case in which the production process data and the performance data are stored in the terminal storage section 122 that the user terminal 12 itself has, the present disclosure is not limited to this. A storage section at which the risk of information leakage is low can be provided, even if not the storage section that the user terminal 12 itself has. Therefore, the storage section that stores the production process data and the performance data may be a storage section that is different than the storage section that the user terminal 12 has. For example, a storage section that is different than the storage section that the user terminal 12 has is connected to the user terminal 12 by a predetermined network (e.g., the internet or a LAN or the like). Data having a high degree of confidentiality can be managed appropriately by storing the production process data and the performance data in an external storage section at which the risk of leakage of information is low.

Moreover, the first data may be stored so as to be distributed in accordance with the level of the degree of confidentiality thereof. For example, data that has a "high" level of degree of confidentiality among the first data may be stored in a storage section S1, data having a "medium" level of degree of confidentiality among the first data may be stored in a storage section S2, and data that has a "low" level of degree of confidentiality among the first data may be stored in a storage section S3. In this case, the user terminal 12 retains a data ID for joining the respective data that have been stored so as to be distributed, and may join these respective data by using the data ID.

Further, the user terminal 12 may carry out statistical analysis that relates to materials development by comparing the data that is stored in the terminal storage section 122 and the data that is stored in the data storage section 162, by using the data ID as a key.

All publications, patent applications, and technical standards mentioned in this specification are herein incorporated by reference to the same extent as if each individual publication, patent application, or technical standard was specifically and individually indicated to be incorporated by reference.

What is claimed is:

1. An information processing system comprising a user terminal that includes a first processor, which is coupled to at least one user terminal memory that is disposed on the user terminal, and a server that includes a second processor, wherein:
   the first processor:
   receives material data from a user;
   extracts first data and second data from the material data, the first data including one or both of data, which relates to processes for producing the material, and data, which relates to performances of the material, and the second data including measurement data obtained by measuring the material via a predetermined measuring method and having a degree of confidentiality that is lower than the first data;
   provides a data ID to a combination of the first data and the second data;
   stores a first pair consisting of the first data and the data ID in a first storage section of the at least one user terminal memory, wherein a risk of information leakage in the first storage section is relatively low; and
   transmits only a second pair consisting of the second data and the data ID to the server, and
   the second processor:
   receives the second pair consisting of the second data and the data ID transmitted from the user terminal;
   stores the second pair consisting of the second data and the data ID in a second storage section that is accessible from the server and which is a dedicated storage dedicated to storage of data corresponding to the user terminal that transmitted the second data, wherein a risk of information leakage in the second storage section is higher than the risk of information leakage in the first storage section;
   selects one or more analyzing techniques from the second storage section based on the second data and carries out material analysis corresponding to the second data, and generates analysis results data corresponding to the second data using the selected one or more analyzing techniques; and
   transmits the analysis results data to the user terminal.

2. An information processing method that is executed in an information processing system having a user terminal that includes a first processor, which is coupled to at least one user terminal memory that is disposed on the user terminal, and a server that includes a second processor, the method comprising:
   at the first processor:
   receiving material data from a user;
   extracting first data and second data from the material data, the first data including one or both of data, which relates to processes for producing the material, and data, which relates to performances of the material, and the second data including measurement data obtained by measuring the material via a predetermined measuring method and having a degree of confidentiality that is lower than the first data;
   providing a data ID to a combination of the first data and the second data;
   storing a first pair consisting of the first data and the data ID in a first storage section of the at least one user terminal memory, wherein a risk of information leakage in the first storage section is relatively low; and transmitting only a second pair consisting of the second data and the data ID to the server, and at the second processor:

receiving the second pair consisting of the second data and the data ID transmitted from the user terminal;

storing the second pair consisting of the second data and the data ID in a second storage section that is accessible from the server and which is a dedicated storage dedicated to storage of data corresponding to the user terminal that transmitted the second data, wherein a risk of information leakage in the second storage section is higher than the risk of information leakage in the first storage section;

selecting one or more analyzing techniques from the second storage section based on the second data and carrying out material analysis corresponding to the second data using the selected one or more analyzing techniques, and generating analysis results data corresponding to the second data; and transmitting the analysis results data to the user terminal.

3. The information processing system of claim 1, comprising a plurality of user terminals, wherein the server has access to a plurality of second storage section each dedicated to storage of data for corresponding one of the plurality of user terminals, and the server stores the second data and the analysis results data in the second storage section dedicated to the user terminal that transmitted the second data.

4. The information processing system of claim 3, wherein server selects one or more analyzing techniques from an analyzing technique storage section of the second storage section that is dedicated to the user terminal that transmitted the second data.

5. The information processing system of claim 1, wherein the first data includes a plurality of data parts with differing level of degree of confidentiality, and the plurality of data parts are stored so as to be distributed at a plurality of storage sections in accordance with the level of the degree of confidentiality of the respective data part.

6. The information processing system of claim 1, wherein the user terminal carries out statistical analysis that relates to materials development by comparing the first data that is stored in the first storage section with data stored in the second storage section by using the data ID as a key.

7. The information processing system of claim 1, wherein the second data is data obtained through a small-angle X-ray scattering (SAXS) method or the like.

8. The information processing system of claim 7, wherein the analysis results data is the particle diameter of the particles contained in the material and the existence ratio of particles of the particle diameters.

9. The information processing system according to claim 8, wherein a result of the statistical analysis is used to obtain, with respect to a material with a given performance, the analysis results data corresponding to the material with the given performance, or information relating to processes for producing the material with the given performance.

10. The information processing system according to claim 4, wherein the user terminal, using the data ID as a key, retrieves the first data that has been distributed at the plurality of storage section and joins the first data that has been distributed into a single data.

11. The information processing system according to claim 1, wherein the user terminal has an access to at least one external memory different from the at least one user terminal memory, and the user terminal stores the first pair in a third storage section of the at least one external memory, a risk of information leakage in the third storage section being lower than a risk of information leakage in the second storage section.

12. The information processing system according to claim 1, comprising a plurality of servers, wherein each server of the plurality of servers is a dedicated server dedicated to one of the one or more analyzing techniques.

13. The information processing system according to claim 1, comprising a plurality of servers and a plurality of user terminals, wherein each server of the plurality of servers is a dedicated server dedicated to one of the plurality of user terminals.

14. The information processing system according to claim 1, wherein the second processor selects one or more analyzing techniques from the second storage section based on a value or a type of the measurement data in the second data.

* * * * *